Jan. 17, 1939.  B. H. STONE  2,143,962
FLUID FLOW METER
Filed Dec. 14, 1936  3 Sheets-Sheet 2
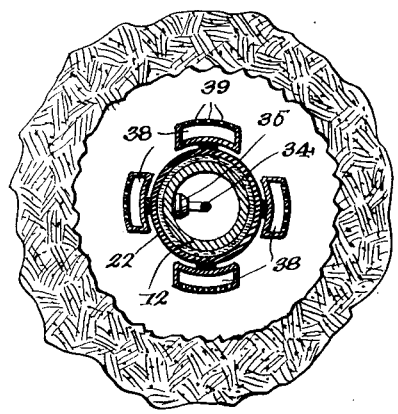
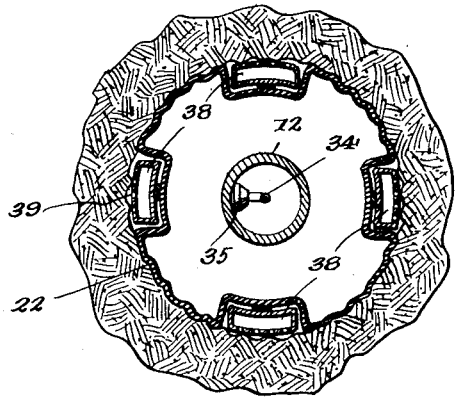
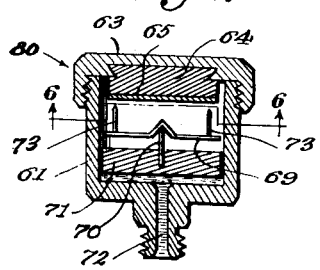
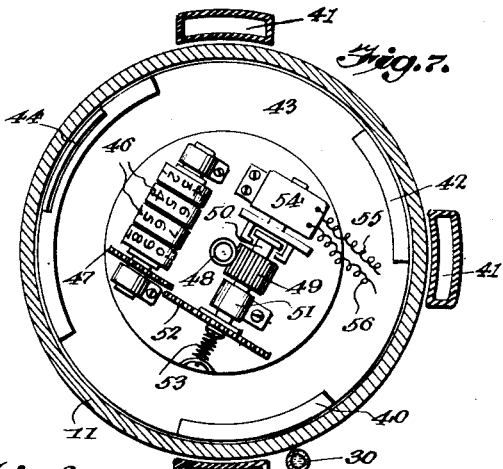
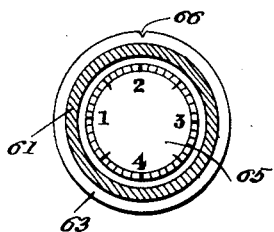
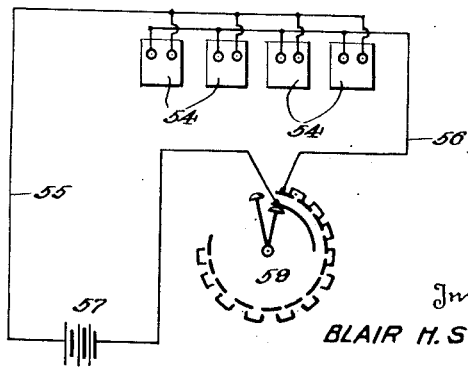
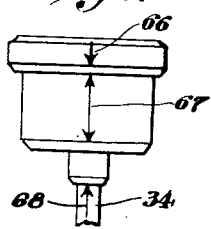
Inventor
BLAIR H. STONE
By Loyd J. Miller
Attorney Jan. 17, 1939.  B. H. STONE  2,143,962
FLUID FLOW METER
Filed Dec. 14, 1936  3 Sheets-Sheet 3
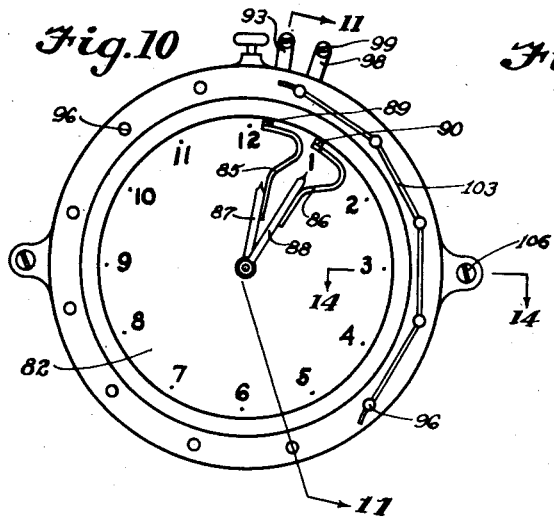
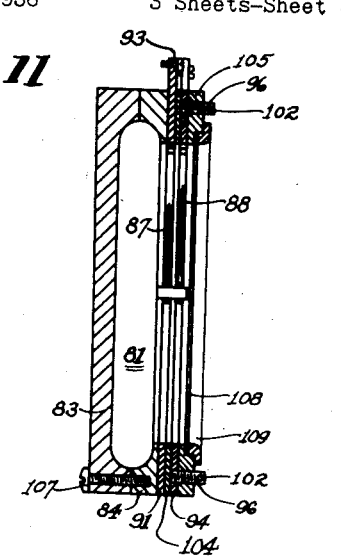
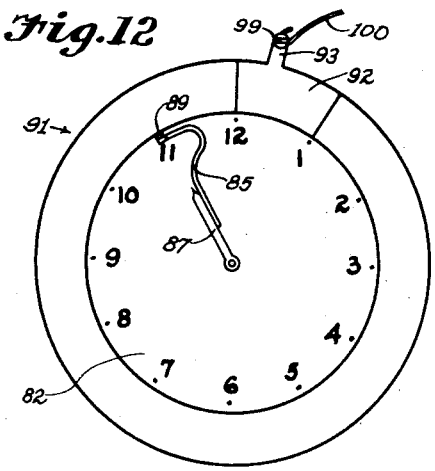
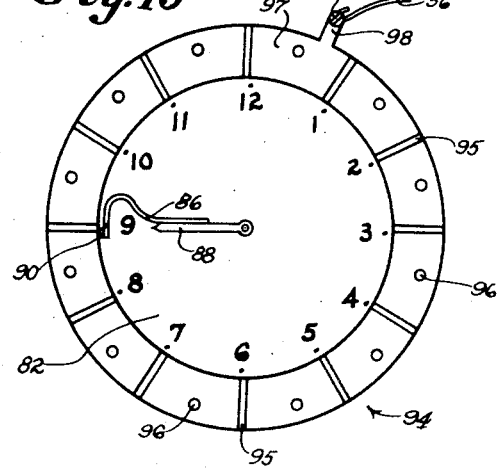
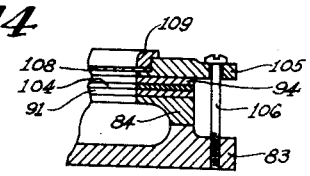
BLAIR H. STONE
INVENTOR
BY Loyal J. Miller
ATTORNEY Patented Jan. 17, 1939

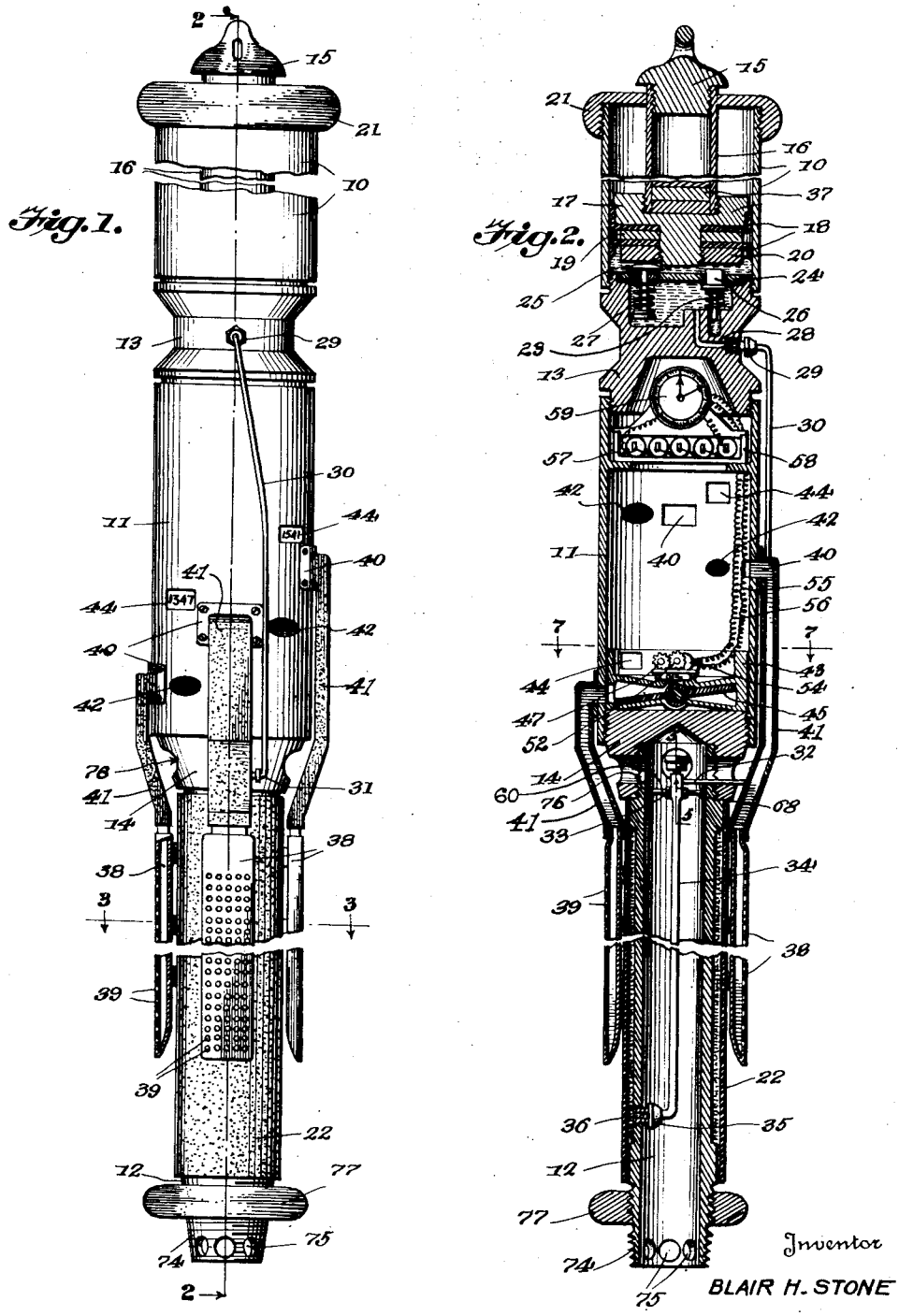

2,143,962

UNITED STATES PATENT OFFICE 2,143,962

FLUID FLOW METER

Blair H. Stone, El Reno, Okla.

Application December 14, 1936, Serial No. 115,663

14 Claims. (Cl. 73—51)

The invention relates to improvements in fluid flow meters generally and more particularly to a type thereof for determining terrestrial directions of flow and varying subterranean rates of flow of liquids and gases.

It has been ascertained that the flow of fluids into an earth-hole, such as a drilled well or the like, is seldom equal from all terrestrial directions, the liquids and gases being usually present in subterranean formations having slope, so that the flow into an earth-hole from the high side of a formation will be greater than that from the low side, due to the hydraulic gradient of the formation. Gases, particularly, are usually held in domes or folds and, if a well is put down at the center of a dome, the directional rates of flow into the well will usually be equal, or substantially so, while a well put down toward or at the edge of the dome will have maximum flow from its side closest to the center of the dome. A fore-knowledge of this direction of maximum flow of liquids and gases into a well, predicated upon accurate informative data, is therefore of great value to the well drilling industry, particularly in oil field development.

The primary object of the instant invention, therefore, is to provide an instrumentality by means of which the aforesaid accurate informative data can be readily ascertained and quickly and simply prepared and made available.

Another object of the invention is to provide a meterage device which will accurately measure and indicate the varying rate of flow of liquids and/or gases into a hole in the earth relative to the terrestrial directions of such flow; particular reference being had to gas, oil, and water holes bored into the earth.

Still another object of the invention has to do with the provision of a meterage device of the kind mentioned, the readings from which may be used to determine the direction from which the maximum flow of a fluid enters an earth-hole, such as a drilled well or the like.

A further object of the invention resides in the provision of a meterage device as hereinbefore characterized which is adapted to be lowered into a well to a predetermined depth, which will measure and register the fluid flow at that depth, and which can then be withdrawn for observation purposes, after which withdrawal the directional flow conditions of the well can be accurately arrived at from indications and readings to be ascertained from various parts and instrumentalities of the device.

Another object of the invention lies in providing a meterage device which will, when it has been lowered into a well to a predetermined depth, divide a section of the wall of the well into a plurality of open-to-flow areas or sections, will measure flow of liquids or gases from each open area or section, both in relation to a time interval that the areas or sections are under flow measurement, and with relation to the directions of maximum, intermediate, and minimum flow, and which will register such measurements.

Yet another object of the invention is to provide a meterage device having a time control mechanism which is adapted to be set in such manner that, when the device is lowered into a well it will, after a predetermined period of time, first act to put the flow measuring, indicating and registering instrumentalities into operation and thereafter, after a second predetermined period of time, will stop the operation of the instrumentalities before the withdrawal of the device from the well for observation of the indicated and registered data.

Still another object of the invention is to provide the meterage device with a form of packing that may be respectively expanded or contracted as the device is lowered or raised in a well; the packing, when expanded, functioning to divide the wall of the well into a plurality of equidistantly spaced open-to-flow areas or sections about the device; the areas or sections of the well wall between the open-to-flow areas or sections being closed against the flow of a liquid or gas therefrom by the packing.

A further object of the invention is to provide a device as before characterized which is so constructed that, when employed to obtain indications of the direction of maximum flow of fluids into two or more adjacent wells, it serves as an underground surveying instrument; i. e., triangulation of the intersection of the two directions of maximum flow, the rates of flow, and the distance between these wells plotted to scale will give the position from which the flow may be considered as concentrated and the point where a future well should be located to secure maximum recovery per well.

Another object of the invention is to provide a device of the kind mentioned, in the use of which the direction of maximum flow of fluids into a well is accurately determined, and the direction in which increased production may be had in future drilling operations, is thus indicated. Especially may it be used for this purpose when the drilled well is not producing in sufficient quantity to be commercially valuable.

Yet another object of the invention is to provide such a device which may be operatively positioned within a well at any selected distance from the well bottom, so that measurements of flow of fluids into the well may be made at varying depths, for determining the variation in the rate of flow with relation to the depth, in a producing formation.

Still another object of the invention is to provide a device of the type set forth through which the flow from the well is by-passed, thus preventing the wall section undergoing flow measurement or test from being disturbed.

A further object of the invention resides in the provision of a device of this kind which will indicate information concerning the directional variance in flow of fluids into a well, from which information it can be determined whether or not it would be economical to drill a well in the direction from which least flow is indicated.

Another object of the invention is to provide a meterage device which will, with repeated use at intervals during the life of a well, give data relative to the directional rate of decline in flow of fluid into the well and from which estimates may be made of the potential recovery from the well and the probable life.

Still another object of the invention is to provide a device as characterized and which will facilitate in locating in an oil pool the point of maximum concentration of the oil, so that a greater pool recovery may be expected from wells located in ascertained points or areas of maximum concentration.

With these and other equally important objects in view, the invention resides in the certain new and useful combination, construction, and arrangement of parts and instrumentalities as will be hereinafter more fully described, set forth in the appended claims, and illustrated in the accompanying drawings, in which:

Figure 1 is a side elevational of a practical embodiment of the invention;

Figure 2 is a vertical section taken on the line 2—2 of Figure 1;

Figure 3 is a horizontal section taken on the line 3—3 of Figure 1;

Figure 4 is a sectional view similar to that of Figure 3, but showing the elastic packing expanded to close off a well wall section about the meterage device;

Figure 5 is a vertical section of the compass only taken on the line 5—5 of Figure 2;

Figure 6 is a horizontal section taken on the line 6—6 of Figure 5;

Figure 7 is a horizontal section taken on the line 7—7 of Figure 2 and shows the counter wheel unit and its clutch control of one of the flow measuring meters;

Figure 8 is a diagrammatical view of the electrical control circuit for the electro-magnet actuators for the meter clutch controls;

Figure 9 is a side elevation of the recording compass as it appears when mounted upon the upper end of the pipe length forming a part of the hydraulic system for actuating the expansible well packing.

Figure 10 is a front elevation of a preferred type of time switch for automatically controlling the operation of the meters;

Figure 11 is a sectional view taken along the line 11—11 of Figure 10;

Figure 12 is a front elevation of that part of the switch which co-operates with the hour hand;

Figure 13 is a front elevation of that part of the switch which co-operates with the minute hand; and, Figure 14 is a detailed section taken on the line 14—14 of Figure 10.

Referring to the drawings, wherein like characters of reference denote corresponding parts in the several views thereof, the embodiment of the invention, as is shown therein by way of example, is generally comprised in a carrier assembly within which a plurality of fluid flow meters are housed and provided with fluid inlets spaced about the outer side of the carrier. Surrounding a portion of the carrier is an expansible packing which, when the carrier is lowered into a selected position within an earth-hole, such as a drilled well, is expanded to close off areas or sections of the wall of the well between the meter inlets, so that the flow of fluid into the well from each of a corresponding number of unpacked or open-to-flow wall areas, directly opposed to the inlets and alternately arranged with respect to the closed off areas, will enter a respective inlet and pass to the meter with which such inlet is connected. Thus, each meter will measure and give an indication of the rate of flow of fluid in a given direction from the earth strata under test at the moment. The expansion and contraction of the packing is preferably automatic and is controlled from a suspension means which is operable to lower and raise the carrier into and from a well. A means is provided for attachment to the lower end of the carrier to support it at various distances above and from the bottom of a well, so that directional flow of fluid measurements may be taken for each depth determined upon. When supported in a selected position, the packing, if elastic in nature as shown, is automatically expanded by a hydraulic means which operates consequently to the removal of the weight of the carrier from the suspension means due to the support of the carrier from the well bottom. A compass is mounted within the carrier for the purpose of orienting the instrumentalities relative to the fluid inlets to the meters, in order that the direction of each measured flow of fluid will be accurately indicated; a suitable registering mechanism also being mounted within the carrier to make a permanent indication of the rates of flow of fluid from the several unpacked areas of the well wall, as well as of the directions of such flow. Similarly, an electrical timing mechanism is provided for automatically controlling the starting and stopping of the measuring, indicating and registering instrumentalities, as required during the use and operation of the device.

With this understanding of the advantages, objects, purposes, general construction and operation, of the invention, the illustrated form of carrier is comprised in an upper hydraulic cylinder 10, an intermediate tubular part 11, and a lower tubular part 12. The adjacent ends of the cylinder 10 and the part 11 are in screw threaded connection with opposite ends of a head 13 and the similar ends of the parts 11 and 12 in like connection with opposite ends of a second head 14.

A supporting head 15, to which a suspension cable or the like (not shown) is to be attached for lowering and raising the carrier assembly into and from a well is screw threaded into a tubing 16 that functions as a piston rod for a hydraulic piston 17 which is also screw threaded to the tubing 16 and is fitted to the bore of the cylinder 10. The piston 17 is provided with cup packings 18 interspaced by a washer 19 and clamped on the piston by a jamb nut 20. The piston 17 is retained within the cylinder 10 by an end cap 21 in screw threaded connection with the upper end of the cylinder, and the cap has a central opening in it for the projection therethrough of the end of the piston rod tube 16 engaged by the supporting head 15. The outer edge of the cap 21 is preferably thickened and rounded off so as to serve as a guide when the carrier is being lowered into or withdrawn from a well bore.

An expansible packing 22, preferably in the form of an elastic sleeve, surrounds the lower tubular part 12, and is normally collapsed or contracted to a diameter but slightly greater than that of the carrier part 12 which is itself of a less diameter than that of the carrier parts 10 and 11 whose diameter is substantially equal. For the hydraulic expansion and contraction of the packing 22 under operative movements of the piston 17, the upper side of the head 13 is provided with an annular depression which is closed by a cover plate 24, in which a suction valve 25 and a discharge valve 26 are mounted, these valves being normally held against their respective seats by coil springs, 27 and 23 respectively. A duct 28 passes from the interior of the upper end of the head 13 to the outside, where it communicates by means of a coupling 29 to a fluid transfer line 30 leading downwardly to a point adjacent the upper end of the carrier part 12 as in Fig. 1. The lower end of the line 30 is coupled, as at 31, to a pipe section 32 which passes radially into the carrier part 12, through a wall of the head 14. This pipe section 32 at its inner end is, in turn, coupled, as at 33, to a vertical pipe length 34 depending centrally within the bore of the carrier part 12. The lower end of the pipe 34 is likewise coupled, as at 35, to a passage 36 opening through the wall of the carrier part 12 and into the confined space between the packing 22 and the part 12. A suitable hydraulic fluid normally fills the interior of the upper end of the head 13, the duct 28, and the pipes 30, 32, and 34. The pressure of the hydraulic fluid within the system can be varied by changing the weight of the piston 17 and, to that end, a number of weights 37 are removably housed within the piston tube 16. The elastic packing 22, when engaged over the carrier part 12, will be suitably fastened thereto at each end in a leak-proof manner, as by vulcanizing or the like, in order to form the hydraulic fluid confining space between it and the part 12.

To introduce fluid into the system the coupling 31 is loosened and the end of the transfer line 30 is connected to a source of supply. The piston 17 is drawn upwardly in the cylinder 10 and against the cap 21, causing the cylinder to fill with the hydraulic fluid through the suction valve 25, the duct 28, and the transfer line 30. After thus charging the cylinder 10, the transfer line 30 is reconnected at the coupling 31, as in the first instance. Now, upon lowering the carrier assembly into a well and supporting it at a selected distance above and from the well bottom, as will be hereinafter more fully explained, the piston 17, due to its weight and a consequent slacking off of the carrier suspension means, exerts pressure on the hydraulic fluid, and causes it to discharge downwardly from the cylinder 10 through the discharge valve 26, into the head 13, through the duct 28, the pipes 30, 32 and 34 and into the confined space behind the packing 22, and causes the packing to be expanded to the full diameter of the well bore, as shown in Fig. 4. An upward pull on the supporting head 15, by the suspending medium, to initiate the withdrawal of the carrier assembly from the well, will again move the piston 17 to the top end of the cylinder 10, withdrawing the hydraulic fluid from the space behind the packing 22 back into the cylinder through the suction valve 25.

Several vertically elongated flow intake channels 38 are spaced about the carrier part 12 and are secured in any suitable manner, such as by vulcanization, to the outside of the packing 22. These channels 38 are closed at their lower ends and have their outer walls perforated, as at 39, so that, when the packing 22 is expanded, the channels are bodily moved therewith, assuming the position shown in Fig. 4, and these perforated walls are forcibly held in contact with the opposed unpacked or open-to-flow areas of the well wall. Liquid or gas flowing into the well through these areas enters the channels 38 through these perforations 39. Lifting the carrier assembly by the supporting head 15 lessens the fluid pressure behind the packing 22, by drawing the piston 17 upwardly within the cylinder 10, and causes the packing 22 to contract and move the intake channels 38 back to normal position, where they do not interfere with the movement of the complete device upward or downward in the well.

The upper ends of the flow intake channels 38 are connected respectively to inlets 40 opening through the side of the intermediate carrier part 11 by means of a flexible, for instance elastic tubing 41. These inlets 40 are disposed in juxtaposition to flow discharge ports 42, which also open through the side of the carrier part 11, and which are preferably covered with wire mesh to prevent dirt from entering the casing and clogging the meters.

Mounted within the carrier part 11 are meters 43, corresponding in number to that of the flow intake channels 38, arranged in superposed relation, with the intake and discharge ports of each meter in communication respectively with one of the inlets 40 and one of the discharge ports 42. Only one of the meters 43, the lowest within the carrier part 11, is shown, for the sake of brevity and clarity of description. For the instant disclosure of invention, a disc form of meter 43 is shown, but any other type thereof, for instance, the turbine type, may be substituted. In order that readings may be observed and taken from each of the meters 43, sight openings or windows 44 are provided in the wall of the carrier part 11, at points suitable and proper for the purpose.

As best shown in Figures 2 and 7, the meter 43 consists of a measuring disc 45 operatively mounted within the intake chamber in the lower part of the meter casing; and a set of counter wheels 46 mounted on the top side of the meter casing for actuation by a gear 47 normally disconnected from the measuring disc 45. To operatively connect the counter wheels 46 to the measuring disc 45, the latter is operatively connected to a vertical worm 48 in mesh with a gear 49 keyed on a shaft 50 which is slidably mounted in a fixed bearing 51. Keyed on one end of the shaft 50 is a gear 52 that is adapted to be moved into and out of mesh with the gear 47, corresponding to the shifting movements of the shaft 50 in its bearing 51. The gears 47 and 52 are normally held out of mesh by a spring 53, one end of which is attached to the shaft, and the other end of which is secured to the meter casing 43, as shown in Fig. 7.

Mounted adjacent the end of the shaft 50 which is opposite the gear 52, is the armature of an electro-magnet 54, which is connected by conductors 55 and 56 to a source of current, such as a battery of series connected dry cells 57 (Fig. 2), positioned upon a suitable support 58, within the carrier part 11 above the uppermost of the meters 43. The magnet 54, when energized, causes the shaft 50 to slide through its bearing until the gears 47 and 52 mesh, at which point its movement is arrested by a suitable stop. For automatically controlling the operation of the meters 43, an electric elapsed time switch 59 is provided and it is mounted within the carrier part 11 immediately above the dry cells 57, as shown. As shown in Figure 8, this switch 59 is connected in circuit with the battery 57 and the electromagnets 54, and controls the operation of the counters 46. The electro-magnets 54 are preferably connected in parallel between the conductors 55 and 56.

The construction and operation of the time switch 59 will now be explained. Referring to Figs. 10 to 14, I prefer to use the mechanism 81 and face 82 from an ordinary watch or clock, which mechanism is housed between two annular elements 83 and 84 which together form a protective case. Both these elements 83 and 84 are made of electrically non-conductive material. Spring elements 85 and 86 are respectively secured by suitable means to the hour hand 87 and to the minute hand 88, and the elements 85 and 86 respectively carry contact blocks 89 and 90. Arranged flat against the outer surface of the housing element 84 and in alignment with the hour hand 87 is a flat annular element, which is designated as a whole by the numeral 91. The segment 92 of the element 91 is made of electrically conductive material, and the remaining portion of it is either made of non-conductive material or is insulated electrically from the ends of the segment 92, which, incidentally, may be of any desired length. A terminal post 93 is suitably secured in rigid electrical contact or is made integral with the segment 92, as shown. It will be noted that the spring 85 is so positioned and is of such length that the contact block 89 is forced to slide against the inner annular surface of the element 91 as the hour hand 87 moves about its axis, and makes solid electrical contact with the segment 92 as it passes that segment. This is likewise true of the spring 86, the contact block 90 and the minute hand 88, and its associated and aligned annular element 94, which differs from the element 91 in that it is composed of 12 equal, electrically conductive segments corresponding to the 12 five-minute divisions of the watch face 82. The adjacent ends of each of these 12 segments are electrically insulated from each other, as indicated by the numeral 95, and each segment is in positive electrical contact with a respective outwardly projecting contact post 96. In addition, one of the 12 segments, 97, is provided as shown with a terminal post 98, similar to the post 93. Each of these terminal posts, 93 and 98, is provided with any suitable means, such as a screw 99, to facilitate their connection to conductor wires 100 and 56.

Each contact post 96 is laterally drilled, as indicated by the numeral 102 to facilitate its connection to a conductor wire 103, which may be of a length sufficient to connect any desired number of the posts together depending on the number of five-minute intervals it is desired to operate the meters.

The annular elements 91 and 94 are electrically insulated from each other by an annular element 104, and all are held in position by another annular element 105, which in turn is fastened to the element 83 by means of a pair of oppositely positioned screws, one of which is designated by the numeral 106 (Fig. 14). The two elements 83 and 84 are independently held together by two oppositely positioned screws, one of which is designated by the numeral 107 (Fig. 11). The element 105 is shaped to receive a glass crystal 108 and a bezel 109 for holding the crystal in position.

With this arrangement it will be seen that when the contact block 89 is in electrical contact with the segment 92, and the contact block 90 is in electrical contact with the segment 97, the electrical circuit is completed through the springs 85 and 86, the hands 87 and 88, and the conductors 100 and 56, and the meters would operate. With the segment 92 of the length shown in Figure 12, the electrical circuit could remain closed only a total of one hour, and then only if all the contact posts 96 were electrically connected together by the wire 103. Assuming that the hands were set in the positions shown in Figures 12 and 13, it would take one full hour for the block 89 to make contact with the segment 92, and it would take an additional 15 minutes for the block 90 to make contact with the segment 97, thus closing the circuit. With the wire 103 electrically connecting the first four posts 96, the circuit would remain closed for a total of 25 minutes, or until the minute hand reached a position indicating 26 minutes after the hour.

As shown in Figure 2, the lower head part 14, connecting the intermediate and lower carrier parts 11 and 12 together, is formed substantially frusto-conical in shape and is centrally recessed for the required screw threaded engagement with the lower carrier part 12. Mounted within the upper connected end of the carrier part 12, on the upper end of the pipe length 34, is an encased compass 80, by which the carrier assembly and its instrumentalities are oriented, as will be presently explained. The pipe length 34 is held centered within the lower carrier part 12, just below the compass casing 61, by a cross support 60.

The compass, as best shown in Figures 5 and 6, has a cover 63 in screw threaded connection with the casing 61, and press fitted into a recess of the cover 63 is a semi-hard disc 64, preferably rubber, to the lower face of which a printed compass card 65 is affixed in such relation that numeral indications thereon point toward the centers of respective flow intake channels 38. For instance, the numeral indication "2" on the compass card 65 (Figure 6) is positioned to coincide with a mark 66 on the cover 63 which, in turn, is made to coincide with a mark 67 on the outside of the casing 61 (Figure 9). When the compass 80 is secured in place on the upper end of the pipe 34, the mark 67 is, in turn, registered with a mark 68 on the pipe length 34 (Fig. 9). In this way, a definite directional relation is established between numeral indications on the compass card 65 and each of the flow intake channels 38.

A compass needle 69 is mounted within the casing 61 and is carried by a supporting post 70 which in turn is carried centrally by a piston 71 housed in the lower part of the casing. The casing 61 has a fluid inlet 72 which communicates with the pipe length 34. Rising from the compass needle 69, at different distances from its center, are two punch pins or the like 73 which, when the pressure within the pipe 34 is sufficient to cause the piston 71 to rise within the casing 61, will penetrate the compass card 65. With a fore-knowledge of the magnetic polarity of the compass needle with respect to the eccentric positions of the pins 73, the magnetic polarity of the pin markings on the compass card is known, and the directional relation of the flow intake channels 38 is established. The materials of construction of the carrier assembly parts about the compass are made nonmagnetic for maintenance of its accuracy, and access is to be had to the compass when it is in place on the pipe length 34 within the lower carrier part 12, in a manner to be later explained.

As shown in Figure 2, the lower end of the lower carrier part 12 is screw threaded, as at 74, for the attachment thereto of the aforesaid means for spacing the carrier assembly from the bottom of a well. The said means may be made adjustable as to length, or of interchangeably different lengths, in order that the carrier assembly may be placed at any selected depth within the well.

To permit of continued flow of fluid from a well during the taking of flow measurements with the carrier assembly, the lower and upper ends of the lower carrier part 12 are formed with side openings 75 and 76 respectively, and the lower end of the connecting head 14 is provided with openings disposed in registry with the openings 76 for by-passing the production flow from the lower part of the well upwardly through the carrier. An annular member 77 is threaded onto the screw threads at the lower end of the lower carrier part 12 to function, along with the end cap 21 at the upper end of the upper carrier part 10, as guides for the carrier assembly during its lowering and withdrawal movements into and from a well.

*Operation*

In the use and operation of the meterage device as thus constructed and arranged, the elapsed time switch 59 is adjusted so that sufficient time is allowed for lowering the carrier assembly into a well to a selected depth therein, and for expanding the packing 22 to initiate fluid flow inwardly through the intake channels 38 before the circuit is closed on the electro-magnets 54. Upon the energizing of the electro-magnets 54, the gears 52 are meshed with their respective gears 47, as previously described, and the counter wheel units 46 are thus operatively connected for indicating the flow through each meter. After a certain predetermined period of time has elapsed the switch 59 breaks the circuit and the gear 52 leaves its meshed relation with gear 47. The packing 22 is then deflated and the device is withdrawn from the well. A reading of the counters may be taken through the windows 44, and the compass card 65 may be removed and examined to determine the exact directional location of the various channels 38 during the time the flow was being registered. The registered flow through each meter, together with a knowledge of the direction from which each meter was receiving its flow, definitely determines the direction from which the greatest flow is entering the hole. If fluid should be entering the hole at two or more levels, an indication may be taken at various depths in the well. If readings are taken from two or more wells in the same vicinity, the distance between the wells may be measured, and the data thus obtained may be used in determining mathematically the approximate location which could be expected to produce the greatest possible underground flow.

Having thus fully described a practical embodiment of flow meterage device, it will be understood that various changes in form and details of construction and arrangement of parts and substitutions of equivalent instrumentalities may be resorted to, without departing from the spirit of the invention or its scope as claimed, and I do not wish to be limited except by the prior art and the scope of the appended claims.

I claim:

1. A subterranean fluid flow measuring device, comprising a carrier casing adapted to be lowered into a well, means for packing a section of the well in a manner to divide the section into a plurality of adjacent radially disposed non-flow and open-to-flow areas, and a plurality of meters within said casing adapted to measure the flow of fluid into the well from each open-to-flow area.

2. The device as set forth in claim 1, in which the packing means is expansible, and means for expanding and contracting said packing means.

3. The device as set forth in claim 1, wherein the said packing means is mounted on the said casing and is adapted to be expanded outwardly therefrom by remote control to establish the said non-flow areas of the well wall section in alternate relation with respect to the said open-to-flow areas; and remote control means for expanding and contracting said packing means.

4. The device as set forth in claim 1, and a compass; and means co-operative with the compass for recording the position of the compass needle subsequent to the positioning of the device in a well.

5. The device as set forth in claim 1, and means for controlling the operation of said meters subsequent to the lowering of the device into a well.

6. A subterranean fluid meterage device, comprising a carrier casing adapted to be lowered into a well, an expansible packing carried by said casing for dividing a section of the wall of the well into a plurality of vertical alternately arranged non-flow and open-to-flow areas, a plurality of meters within said casing, and movable inlets to said meters carried by said casing and adapted to be moved by said packing into contact with said open-to-flow areas when the packing is expanded.

7. The device as set forth in claim 6, and means carried by the casing for expanding and contracting the said packing by remote control.

8. The device as set forth in claim 6, and hydraulic means for expanding and contracting the said packing by remote control.

9. The device as set forth in claim 6, and means for lowering and withdrawing the said carrier casing into and from a selected position within the well, and another means on said casing cooperative with the last above named means for expanding and contracting the said packing subsequent to the lowering of the casing into the selected position.

10. The device as set forth in claim 6, and a time controlled means within said carrier casing for automatically rendering said meters operable after the elapse of a predetermined period of time subsequent to the lowering of the casing into the well.

11. A subterranean fluid flow meterage device, comprising a carrier casing, an expansible packing carried by said casing adapted on expansion to divide a selected section of the well wall about the casing into a plurality of alternately arranged non-flow and open-to-flow areas, means operable from the exterior of the casing for expanding and contracting said packing, a plurality of meters within said casing, inlets to said meters carried by said packing and adapted to be moved therewith into and out of contact with said open-to-flow areas respectively when the packing is expanded and contracted, and means for automatically and respectively starting and stopping the operation of said meters after the device is in position in a well.

12. The device as set forth in claim 11, and means for by-passing the production flow of the well upwardly through the casing without interference with the operative functions of the device.

13. The device as set forth in claim 11, and a compass within the said carrier casing, and means cooperative with the compass for recording the position of the compass needle with relation to the open-to-flow areas during the period of meter operation.

14. A subterranean fluid flow measuring device, comprising a carrier adapted to be lowered into a well, a packing carried by said carrier, a plurality of meters in said carrier adapted to measure and indicate the flow of the fluid into the well from different directions about said carrier, and automatic means for rendering said meters operable at a predetermined time, and for rendering them inoperable at a predetermined time thereafter.

BLAIR H. STONE.